(12) United States Patent
Schlansker et al.

(10) Patent No.: US 8,392,571 B2
(45) Date of Patent: Mar. 5, 2013

(54) METHOD AND SYSTEM FOR ALLOCATING BANDWIDTH

(75) Inventors: Michael Schlansker, Los Altos, CA (US); Yoshio Turner, San Francisco, CA (US); Jean Tourrilhes, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 130 days.

(21) Appl. No.: 12/771,059

(22) Filed: Apr. 30, 2010

(65) Prior Publication Data

US 2011/0270987 A1 Nov. 3, 2011

(51) Int. Cl.
*G06F 15/16* (2006.01)

(52) U.S. Cl. ...................................................... 709/226

(58) Field of Classification Search .................. None
See application file for complete search history.

(56) References Cited

U.S. PATENT DOCUMENTS

| | | | |
|---|---|---|---|
| 6,594,265 B1 | 7/2003 | Etorre et al. | |
| 6,646,988 B1 * | 11/2003 | Nandy et al. | 370/235 |
| 7,324,553 B1 * | 1/2008 | Varier et al. | 370/468 |
| 7,599,290 B2 | 10/2009 | Dos Remedios et al. | |
| 7,630,314 B2 | 12/2009 | Dos Remedios et al. | |
| 2002/0018477 A1 * | 2/2002 | Katz | 370/401 |
| 2002/0124104 A1 * | 9/2002 | Rappaport et al. | 709/238 |
| 2004/0028054 A1 * | 2/2004 | Khurana et al. | 370/395.21 |
| 2004/0174883 A1 * | 9/2004 | Johansson et al. | 370/395.31 |
| 2005/0249220 A1 * | 11/2005 | Olsen et al. | 370/395.4 |
| 2005/0276218 A1 | 12/2005 | Ooghe et al. | |
| 2007/0286202 A1 | 12/2007 | Dos Remedios et al. | |
| 2009/0238073 A1 | 9/2009 | Sanjeewa | |

* cited by examiner

*Primary Examiner* — Scott Christensen

(57) ABSTRACT

According to one embodiment of the present invention, there is provided a system for allocating bandwidth in a network to a plurality of traffic classes. Each traffic class has a first bandwidth allocation. The system comprises a network manager which is configured to determine a bandwidth utilization for each traffic class, to determine an amount of unused network bandwidth, to calculate second bandwidth allocations for each traffic class by allocating a share of any determined unused network bandwidth between at least some of the traffic classes, and to update, in accordance with the second bandwidth allocations, a routing table accessible by routers in the network.

20 Claims, 6 Drawing Sheets

METHOD AND SYSTEM FOR ALLOCATING BANDWIDTH

RELATED APPLICATION

The present application contains some common subject matter with U.S. patent application Ser. No. 12/770,978, entitled "METHOD FOR ROUTING DATA PACKETS USING VLANS", filed on 30 Apr. 2010 by Michael Schlansker, Jean Tourrilhes, and Yoshio Turner, the contents of which is incorporated by reference in its entirety.

BACKGROUND

Computer networks are used extensively in many different configurations and in many different environments, from single host networks to networks connecting hosts in their hundreds, thousands, hundreds of thousands, and beyond.

Typically, hosts connect to a computer network through a network switch or router, and in large networks each switch or router may be connected in turn to further switches or routers. Such interconnected network topologies generally enable any host connected to the network to be able to send data to and receive data from any other host connected to the network. Hosts may include any suitable computing device.

However, since the bandwidth of any given computer network is limited by its physical characteristics it is possible for a host making excessive use of the available bandwidth to disrupt the network activities of other hosts. One way to prevent this is to use physically separate computer networks for different for types of data or applications, thereby ensuring that a host cannot disrupt the network traffic of other hosts. However, such an approach is generally costly and is difficult to implement.

BRIEF DESCRIPTION

Embodiments of the invention will now be described, by way of non-limiting example only, with reference to the accompanying drawings, in which.

DETAILED DESCRIPTION

Figure 1:
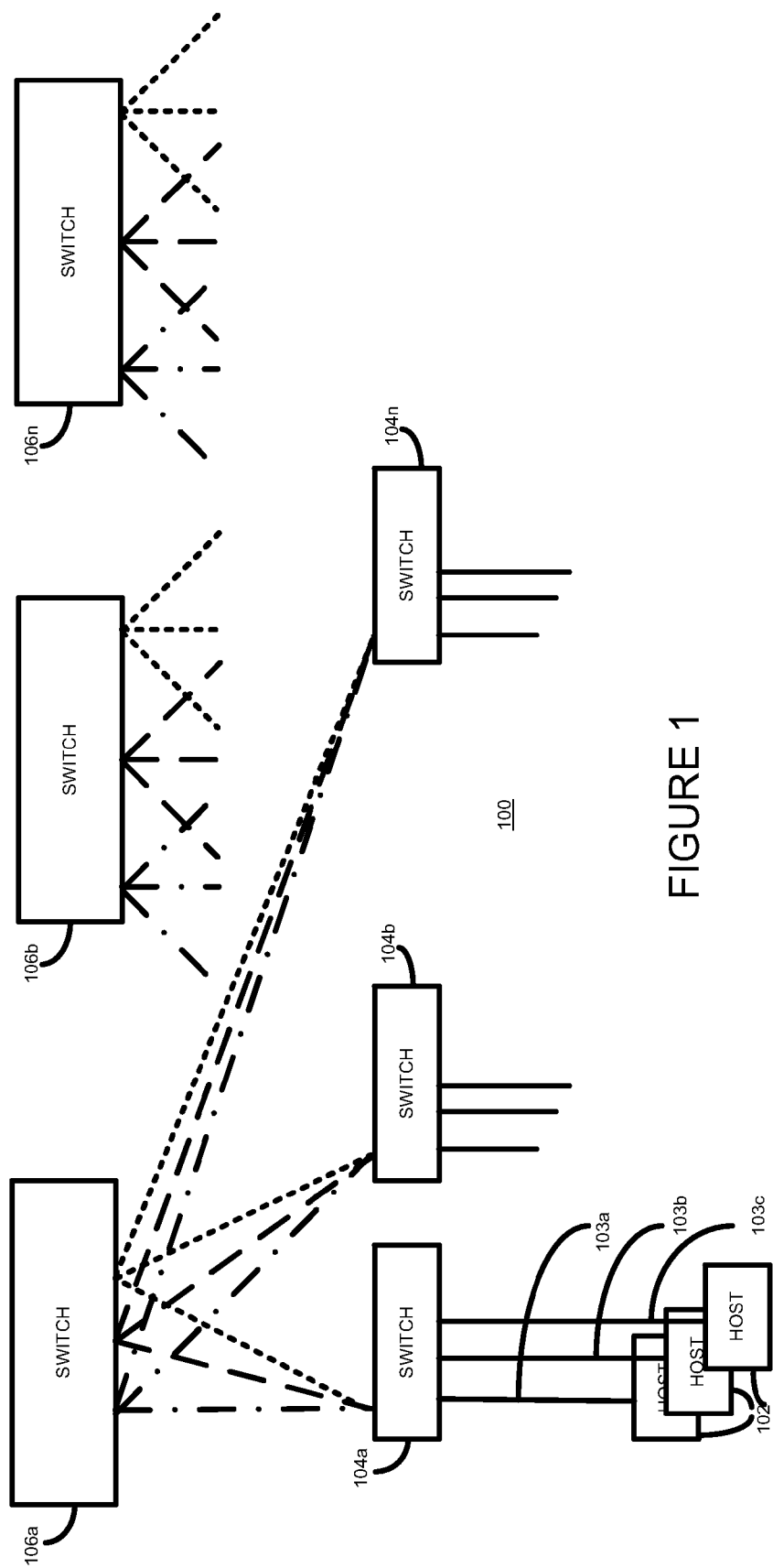
FIG. 1 is a simplified block diagram of a network according to an embodiment of the present invention.

Referring now to FIG. 1 there is shown a simplified block diagram of a system 100 according to an embodiment of the present invention. For reasons of clarity not all elements of the system 100 are shown.

A number of hosts 102 connect to the network 100 through a network switch 104a. In the present embodiment the network 100 is an Internet protocol (IP) network, although in other embodiments other appropriate network protocols may be used. The hosts may include, for example, computer servers, desktop computers, laptop computers, net book computers, and other suitable computing devices. The switch 104a may be referred to as a leaf or an edge switch since it is located at the edge of the network 100. A number of other edge switches 104b and 104n are shown, each of which enable other hosts to connect thereto. Each host 102 connects to the switch 104a through a communication link, respectively 103a, 103b, and 103c. Each communication link may be, for example, an appropriate wired or wireless connection.

Each of the edge switches 104 are configured to allocate data packets received from each host into a traffic class. For example, all received data packets having a packet header comprising certain predetermined characteristics may be allocated to a predetermined traffic class. The predetermined characteristics may include, for example, a destination source address, a source address for the data packet, traffic type identifier, etc.

In one embodiment symmetric traffic class allocation is achieved by allocating data packets in which the result of performing 'exclusive or' (XOR) of source and destination address (XOR(source,destination)) equals a predetermined value to a predetermined traffic class. Symmetric traffic class allocation enables both data packets flowing from a source to a destination as well as data packets from the destination back to the source to be allocated to the same traffic class.

In other embodiments all data packets having a specific VLAN identifier are allocated to the same traffic class. In yet other embodiments hash techniques may be used to allocate data packets to a traffic class.

By allocating each data packet received at each switch to a traffic class enables the data packets in each of the defined traffic classes to be routed in different ways within the network 100. For instance, in a data center which hosts servers and applications from different enterprises, the allocation of data packets to different traffic classes can be used to help maintain separation of data packets.

Each edge switch 104 is connected to one or more top level switches 106a to 106n by multiple data links. For example, in the present embodiment each top level switch 106 is connected to each edge switch 104 via three communication links. In the present embodiment the communication links are Ethernet links, although in other embodiments other kinds of communication links, such as fiber optic links, may be used. In other embodiments a greater or lesser number of communication links between each top level switch and edge switch may be used. Use of multiple communication links between switches increases the bandwidth available for communicating data between the switches, unlike conventional Ethernet network configurations which generally only make use of a single communication link between switches and hosts.

For the purposes of explanation, the following description is based on a network 100 having 5 top level switches and 16 edge switches. For clarity, however, not all of these switches are shown in the accompanying drawings. It will be appreciated, however, that embodiments are not limited to such a configuration, and that other configurations having more or fewer top level or edge switches may be envisaged.

Figure 2:
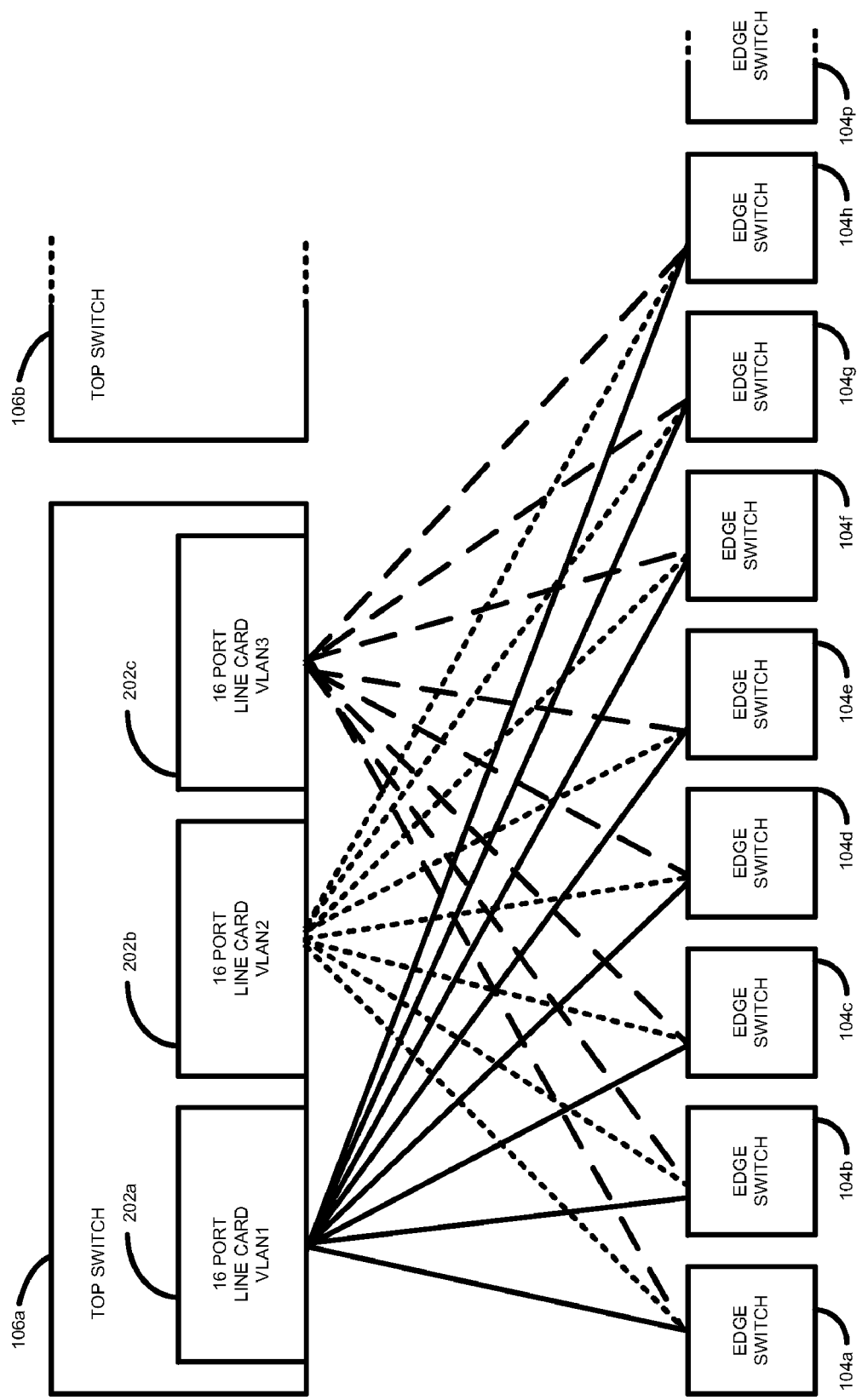
FIG. 2 is a simplified block diagram showing part of a network according to an embodiment of the present invention.

FIG. 2 shows a more detailed illustration of part of the network 100 according to one embodiment. The top switch 106a comprises line cards 202a, 202b, and 202c, each of which has 16 network ports. Each port of each line card 202 is connected by a separate communication link to a separate one of the 16 edge switches 104a to 104p. The communication links to each line card are configured as a single virtual LAN (VLAN). Each top level switch 106 is thus configured with 3 VLANs, with a total of 15 VLANs being configured over all of the 5 top level switches.

For the purposes of the following explanation each of the communication links between the edge switches 104 and the top level switches 106 are full duplex and have a maximum bandwidth of 2 Gb/s (i.e. 1 Gb/s in each direction). The total network bandwidth is thus 480 Gb/s (16×2 Gb/s data links per line card×3 line cards per switch×5 top level switches). Each VLAN thus has a total bandwidth of 32 Gb/s, however the maximum available VLAN bandwidth at any one edge switch is 2 Gb/s.

In the present embodiment, each VLAN transmits and receives data packets over unique communication links. In other words, different VLANs do not share the same physical communication links. Each VLAN enables any host connected to any edge switch to send data to and receive data from any other host connected to any other edge switch within the network 100. In other embodiments, VLANS may share physical communication links with other VLANS.

Each edge switch 104 is initially configured with a routing table defining how data packets assigned to different traffic classes are to be routed over the VLANs available at the switch.

In the present example, three traffic classes are defined in the network 100, and 15 VLANs are configured. In other embodiments a greater or lesser number of traffic classes may be defined. Each traffic class may be allocated, for example, to a different user of a data center, or for data for different applications. For example, in a shared data center hosting servers and applications belonging to different enterprises, data packets from each enterprise may be allocated to different traffic classes. Data packets from one or more traffic classes may be transported over one or more VLANs. The way in which data packets from different traffic classes are communicated over the different VLANs is defined in a routing table. In the present example, each edge switch 104 is configured with an internal routing table. In further embodiments, a single network-wide routing table may be configured which is accessible from each edge switch 104.

The switch routing tables provide a convenient mechanism for distributing the available bandwidth of the network 100 among the different traffic classes.

For example, assume that each data link from each edge switch 104 to each top level switch 106 has a bandwidth of 2 Gb/s, and that each VLAN is allocated to a separate data link. Further, assume that enterprises A, B, and C having hosts in the network 100 are respectively allocated 47%, 33%, and 20% of the available network bandwidth of the network 100. Configuring the routing tables of each switch 104 as shown in Table 1 enables the bandwidth of the network 100 to be shared in this manner.

TABLE 1

Example routing table

| TRAFFIC CLASS | VLAN(S) ALLOCATED |
|---|---|
| 1 | 1, 2, 3, 4, 5, 6, 7 |
| 2 | 8, 9, 10, 11, 12 |
| 3 | 13, 14, 15 |

Such an arrangement enables a spatial distribution of the available bandwidth in the network 100 to be made. Advantageously, such a spatial distribution may be implemented on many commercially available commodity switches.

The embodiments described above provide a fixed bandwidth allocation to each traffic class. However, if one traffic class is not using all of its bandwidth allocation the remaining bandwidth remains unused. Whilst this is not particularly problematic, the efficiency of such networks may remain low under certain circumstances.

Figure 3:
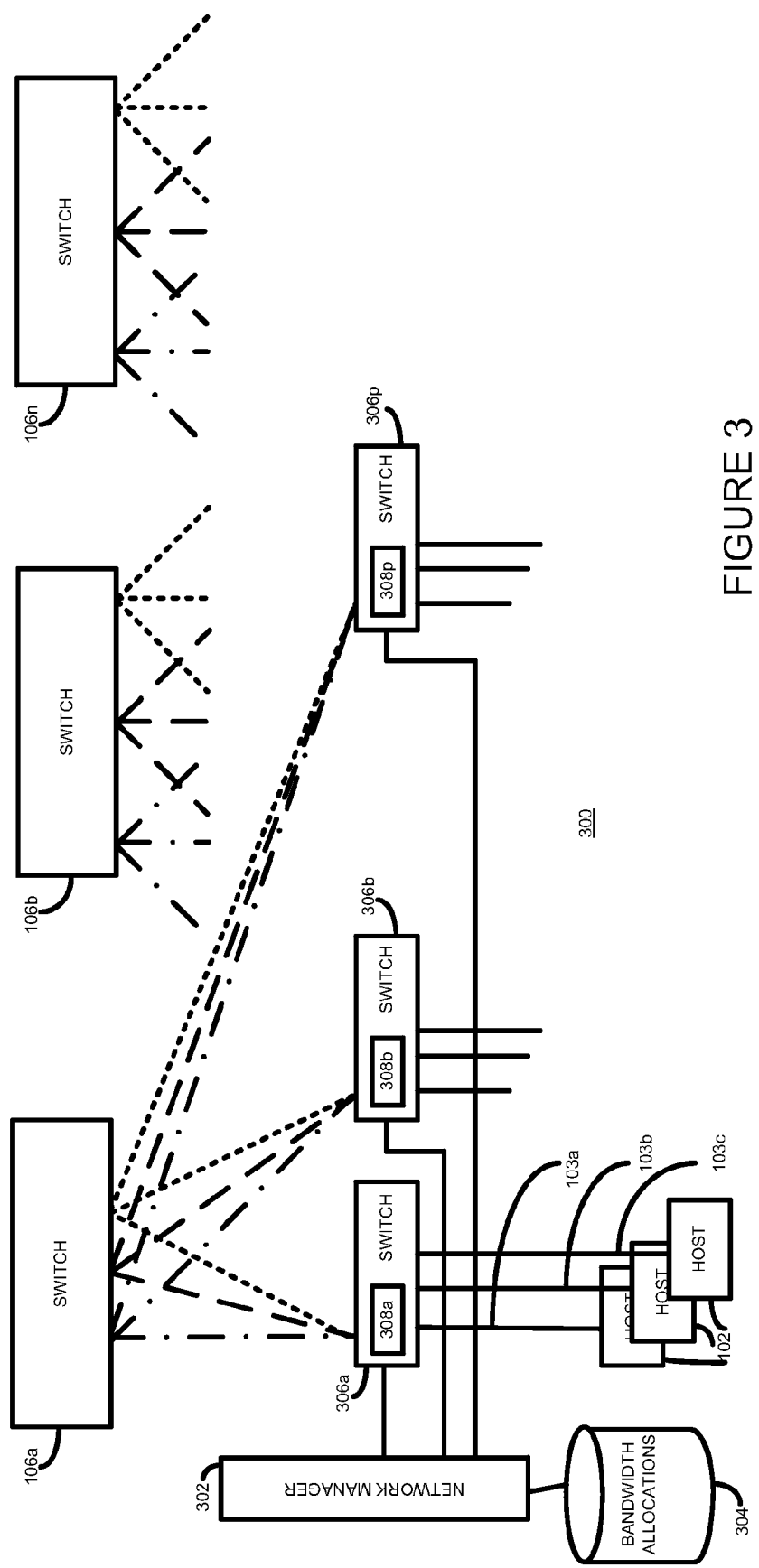
FIG. 3 is a simplified block diagram of a network according to an embodiment of the present invention.
Figure 4A:
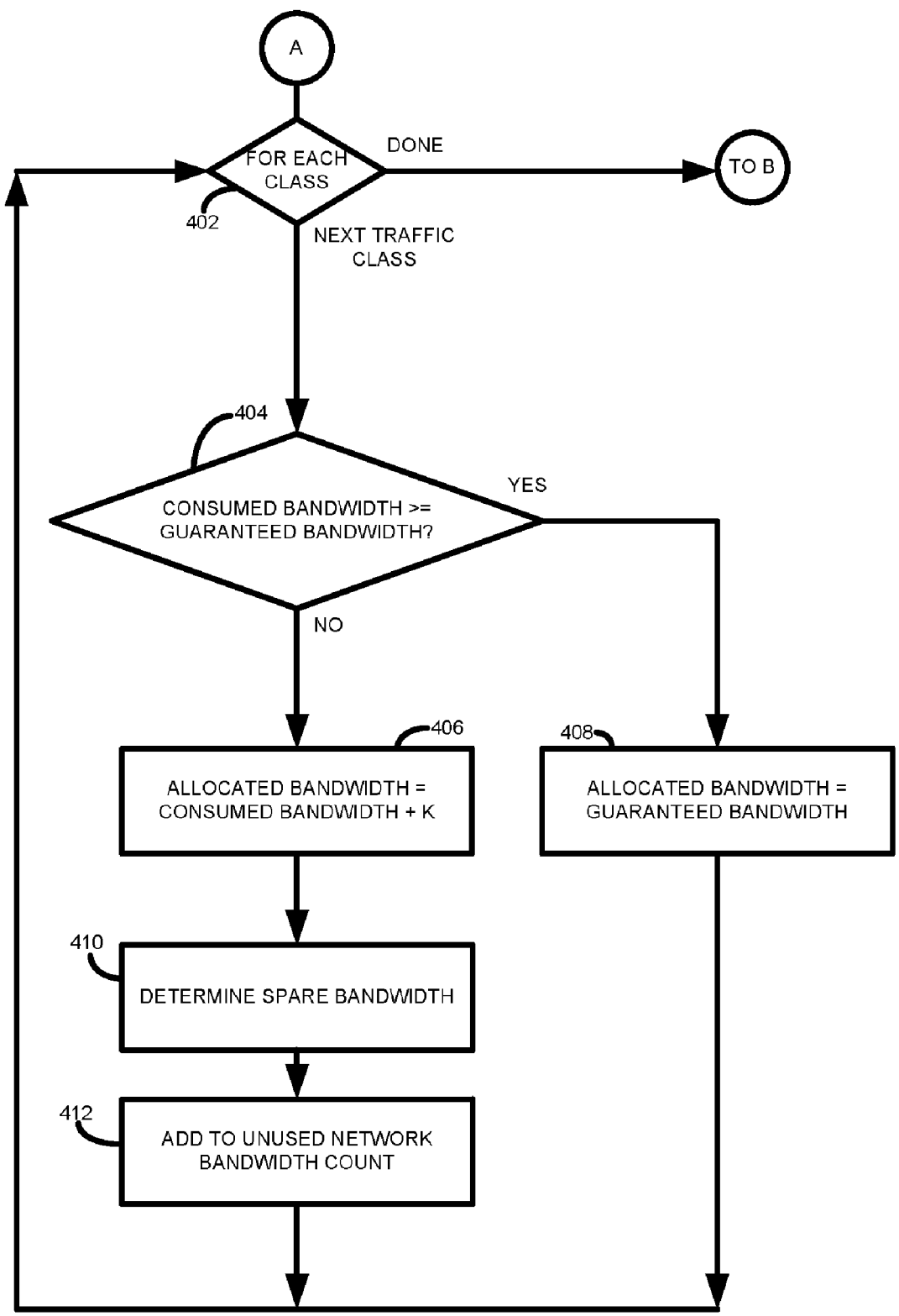
FIG. 4 is a simplified flow diagram outlining a method according to an embodiment of the present invention.

FIG. 3 shows a network 300 according to a further embodiment of the present invention that provides a dynamic spatial bandwidth allocation mechanism that enables any traffic class to use all of its allocated bandwidth should it be required to do so. Furthermore, a mechanism is provided which enables unused bandwidth within the network to be temporarily allocated to some or all of the traffic classes. Further reference will be made to the flow diagrams of FIG. 4a and FIG. 4b.

A network manager 302 obtains a guaranteed bandwidth allocation ($B_G$) for each traffic class from a bandwidth allocation data store 304. The guaranteed bandwidth allocation $B_G$ defines an amount of bandwidth, or a percentage of the available bandwidth, of the network 300 that each traffic class defined in the network is guaranteed to have available to it should it require it. The network manager 302 generates a routing table, based on the guaranteed bandwidth allocation data, such as the routing table shown above in Table 1 and configures each of the switches 306 with the determined routing table.

Once the routing tables have been configured in each of the edge switches 306 the network may be used by the hosts 102 to send and receive data. As described above, each edge switch allocates each data packet received from a host to a traffic class defined by the routing table. Each edge switch then routes the data packets over the appropriate VLAN as defined in the switch routing table. The top level switches 106a then route or forward the data packets in a conventional manner.

The edge switches 306 each comprise a traffic monitor module 308. The traffic monitor modules 308 enable a network manager 302 to obtain traffic data relating to each of the traffic classes from each edge switch 306. For example, in one embodiment each traffic monitor module 308 may determine, for each edge switch 306, the amount of bandwidth used by each traffic class over a predetermined period P. In other embodiment other bandwidth determinations may be made. The period of time may be, for instance, 1 second, 10 seconds, 1 minute, 5, minutes, 1 hour, or any other suitable period. In one embodiment the period may be chosen or modified based on the dynamic bandwidth needs of the hosts 104.

The network manager 302 analyzes (402) the data usage of each traffic class at each edge switch 306 in the following manner.

At 404 the network manager 302 determines, for the previous period P, the bandwidth consumed ($B_C$) by the current traffic class. In one embodiment the consumed bandwidth is determined based on consumed bandwidth determined from one or more edge switches 306. For example, in one embodiment the consumed bandwidth may be an average bandwidth determined from one or more edge switches 306. In other embodiments the consumed bandwidth may be based on bandwidth utilization measured from a single edge switch 306. If the consumed bandwidth ($B_C$) is greater than or is equal to the guaranteed bandwidth ($B_G$) the allocated bandwidth ($B_A$) for the traffic class is set (408) to equal the guaranteed bandwidth ($B_G$) for that traffic class.

$$B_A = B_G$$

The next traffic class is then analyzed.

Otherwise, if the network manager 302 determines (404) that the consumed bandwidth ($B_C$) is less than the guaranteed bandwidth ($B_G$) for that traffic class, the allocated bandwidth ($B_A$) for the traffic class is set to the consumed bandwidth ($B_C$) plus a predetermined amount (K).

$$B_A = B_C + K$$

However, at this stage the allocated bandwidth ($B_A$) may not be made greater that the guaranteed bandwidth ($B_G$).

The predetermined amount (K) by which the allocated bandwidth is increased may be, for example, a fixed amount, such as 2 Gb/s, or a percentage, such as 20%. Those skilled in the art will appreciate that other fixed amounts may be used. The value of K may be based, for example, on a percentage of the total bandwidth of the network 300 taking into account, for example, the number of VLANs, switches, or other parameters.

The purpose of adding an amount K of bandwidth to the allocated bandwidth is to enable the bandwidth allocated to a traffic class to be increased, subject to there being spare bandwidth in the network, to greater than its guaranteed bandwidth. Since the edge switches do not know the bandwidth requirements of each host, the system has no way of determining how much bandwidth a traffic class requires at any given time. In the present embodiment, however, the allocated bandwidth is increased (406) by an amount K and the bandwidth consumed by that traffic class is then measured (404) in the next cycle to determine whether that additional bandwidth was used (and was hence required by the host).

At 410 the network manager 302 determines whether the current traffic class bandwidth allocation ($B_A$) is less than its guaranteed amount of bandwidth ($B_G$). If so, any positive difference between the two represents that amount of surplus bandwidth that is expected during the next time period P. The amount of spare bandwidth is added to a network-wide unused bandwidth count ($B_U$).

$$B_U = B_U + (B_G - B_A)$$

The network manager 302 then analyzes the next traffic class.

When the network manager 302 has analyzed each traffic class the network manager 302 distributes (416) any unused bandwidth ($B_U$) between the different traffic classes. The distribution of any unused bandwidth ($B_U$) may be performed in many different ways. For example, in one embodiment each traffic class that has an allocated bandwidth ($B_A$) equal to its guaranteed bandwidth ($B_G$) receives a share of the unused bandwidth ($B_U$). In other embodiments, all of the traffic classes may receive a share of the unused bandwidth. The unused bandwidth may be distributed, for example, based on an equal distribution or in a weighted distribution.

The network manager 302 updates the bandwidth allocations ($B_A$) for each traffic class that received a share of the unused bandwidth and generates (418) a new routing table based on the new bandwidth allocations.

In one embodiment the new routing table allocates whole VLANs to each traffic class based on the new traffic class bandwidth allocations. Table 2 below shows example new bandwidth allocations for each traffic class.

TABLE 2

Example allocated bandwidths

| ALLOCATED BANDWIDTH PER TRAFIC CLASS | BANDWIDTH (Gb/s) |
|---|---|
| $B_{A\,TC1}$ | 256 |
| $B_{A\,TC2}$ | 160 |
| $B_{A\,TC3}$ | 64 |

If, as in the above-described example, each VLAN has a total bandwidth of 32 Gb/s, traffic class 1 will be allocated 8 VLANs, traffic class 2 will be allocated 5 VLANs, and traffic class 3 will be allocated 2 VLANs, as shown below in table 3.

TABLE 3

Example updated routing table

| TRAFFIC CLASS | VLAN(S) ALLOCATED |
|---|---|
| 1 | 1, 2, 3, 4, 5, 6, 7, 8 |
| 2 | 9, 10, 11, 12, 13 |
| 3 | 14, 15 |

In the present embodiment, each VLAN is only allocated to a single traffic class. Thus, in situations where the determined bandwidth allocations are not whole factors of the VLAN bandwidth, appropriate adjustment is made.

For example, consider the example allocated bandwidths shown below in Table 4.

TABLE 4

Example allocated bandwidths

| ALLOCATED BANDWIDTH PER TRAFFIC CLASS | BANDWIDTH (Gb/s) |
|---|---|
| $B_{A\,TC1}$ | 276 |
| $B_{A\,TC2}$ | 160 |
| $B_{A\,TC3}$ | 44 |

The allocated bandwidth of traffic class 1 equates to 8.625 VLANs, the allocated bandwidth of traffic class 2 equates to 5 VLANs, and the allocated bandwidth of traffic class 3 equates to 1.375 VLANs. In the present example the number of VLANs allocated to each traffic class are adjusted up or down, as appropriate, so that a whole number of VLANs are be allocated to each traffic class. For example, as shown in Table 5 below the routing table is determined such that traffic class 1 is allocated 9 VLANs, and traffic class 3 is allocated 1 VLAN. This determination may be based, for example, on a weighting that gives priority to traffic class 1 over traffic class 3. Those skilled in the art will appreciate that other ways of determining the distribution of VLANs to traffic classes may be used.

TABLE 5

Example updated routing table

| TRAFFIC CLASS | VLAN(S) ALLOCATED |
|---|---|
| 1 | 1, 2, 3, 4, 5, 6, 7, 8, 9 |
| 2 | 10, 11, 12, 13, 14 |
| 3 | 15 |

In a further embodiment VLANs may be shared by multiple traffic classes. For example, given the bandwidth allocations shown above in Table 4, two or more traffic classes may be allocated the same VLAN, as shown below in Table 6.

TABLE 6

Example updated routing table

| TRAFFIC CLASS | VLAN(S) ALLOCATED |
|---|---|
| 1 | 1, 2, 3, 4, 5, 6, 7, 8, 9 |
| 2 | 10, 11, 12, 13, 14 |
| 3 | 9, 15 |

It can be seen that both traffic classes 1 and 3 have both been allocated VLANs 9. In one embodiment load balancing techniques are used to cater for such shared VLAN assignments. For example, where hash-based routing techniques are used, a full complement of hash classes may be assigned to each of the dedicated VLANS 1 to 8, while a few number of hash classes may be assigned to the shared VLAN 9. The number of hash classes assigned to VLAN 9 can be set to be approximately in proportion to the amount of VLAN 9 bandwidth to be shared. Similarly, for traffic class 3 VLAN 15 may receive a full complement of hash classes, while a smaller number of hash classes are allocated to shared VLAN 9.

One advantage of enabling sharing of VLANs between traffic classes is that it enables the determined allocated bandwidths of each traffic class to be more closely respected. The sharing of VLANs between traffic classes provides a temporal data packet distribution for those shared VLANs.

Once the network manager 302 has determined the new routing tables it updates (420) the routing tables in the network. For example, where each edge switch 306 has its own routing table the network manager 302 updates the routing tables in each of the edge switches 306. Where each edge switch references a network-wide routing table the network manager 302 updates the network-wide routing table.

The network manager 302 then resets the unused bandwidth count ($B_U$) and waits (422) a predetermined period of time before repeating the above-described process. The predetermined period may, for example, be 1 second, 10 second, 1 minute, etc. or any other suitable period. The predetermined period may, in some embodiments, be dynamically adjusted based on network traffic conditions or other appropriate factors.

Operation of the above-described process, is further illustrated below with further reference to Tables 7 and 8. In the following example the predetermined period P used in 422 is set to 30 seconds and the predetermined amount (K) by which the bandwidth is increased or decreased is 5 Gb/s.

TABLE 7

Example traffic class guaranteed bandwidths

| GUARANTEED BANDWIDTH PER TRAFIC CLASS | BANDWIDTH (Gb/s) |
|---|---|
| $B_{G\,TC1}$ | 124 |
| $B_{G\,TC2}$ | 160 |
| $B_{G\,TC3}$ | 96 |

TABLE 8

Example bandwidth allocation evolution over time

| PERIOD | $B_{A\,TC1}$ | $B_{A\,TC2}$ | $B_{A\,TC3}$ | $B_{C\,TC1}$ | $B_{C\,TC2}$ | $B_{C\,TC3}$ | $B_U$ |
|---|---|---|---|---|---|---|---|
| 1 | 224 | 160 | 96 | 220 | 120 | 86 | 30 |
| 2 | 234 | 140 | 106 | 232 | 100 | 86 | 50 |
| 3 | 240.66 | 126.66 | 112.66 | 238 | 124 | 108 | 26 |
| 4 | 224 | 137 | 96 | ... | ... | ... | ... |
| 5 | ... | ... | ... | ... | ... | ... | ... |

At the beginning of period $P_1$ traffic class 1 had an allocated bandwidth of 224 Gb/s, traffic class 2 had an allocated bandwidth of 160 Gb/s, and traffic class 3 had an allocated bandwidth of 96 Gb/s. At the end of period $P_1$ the measured consumed bandwidth of traffic class 1 was 220 Gb/s, the consumed bandwidth of traffic class 2 was 120 Gb/s, and consumed bandwidth of traffic class 3 was 86 Gb/s.

At 406, the allocated bandwidth of traffic class 1 is increased (406) to 224 Gb/s, the allocated bandwidth of traffic class 2 is increased (406) to 130 Gb/s, and the allocated bandwidth of traffic class 3 is increased (406) to 96 Gb/s. This gives the total unused bandwidth determined at 410 as 30 Gb/s. At 416 each traffic class is given an equal share of the unused bandwidth, and the new bandwidth allocations for each traffic classes 1, 2, and 3, become respectively 234 Gb/s, 140 Gb/s, and 106 Gb/s for period $P_2$.

At the end of period $P_2$ the measured consumed bandwidth of traffic class 1 was 232 Gb/s, the consumed bandwidth of traffic class 2 was 100 Gb/s, and consumed bandwidth of traffic class 3 was 86 Gb/s.

At 406, the allocated bandwidth of traffic class 1 is set to its guaranteed bandwidth of 224 Gb/s, the allocated bandwidth of traffic class 2 is increased (406) to 110 Gb/s, and the allocated bandwidth of traffic class 3 is increased (406) to 96 Gb/s. This gives the total unused bandwidth determined at 410 as 25 Gb/s. At 416 each traffic class is given an equal share of the unused bandwidth, and the new bandwidth allocations for each traffic classes 1, 2, and 3, become respectively 240.66 Gb/s, 126.66 Gb/s, and 112.66 Gb/s.

As described above, appropriate routing tables are generated based on the new bandwidth allocations.

Figure 5:
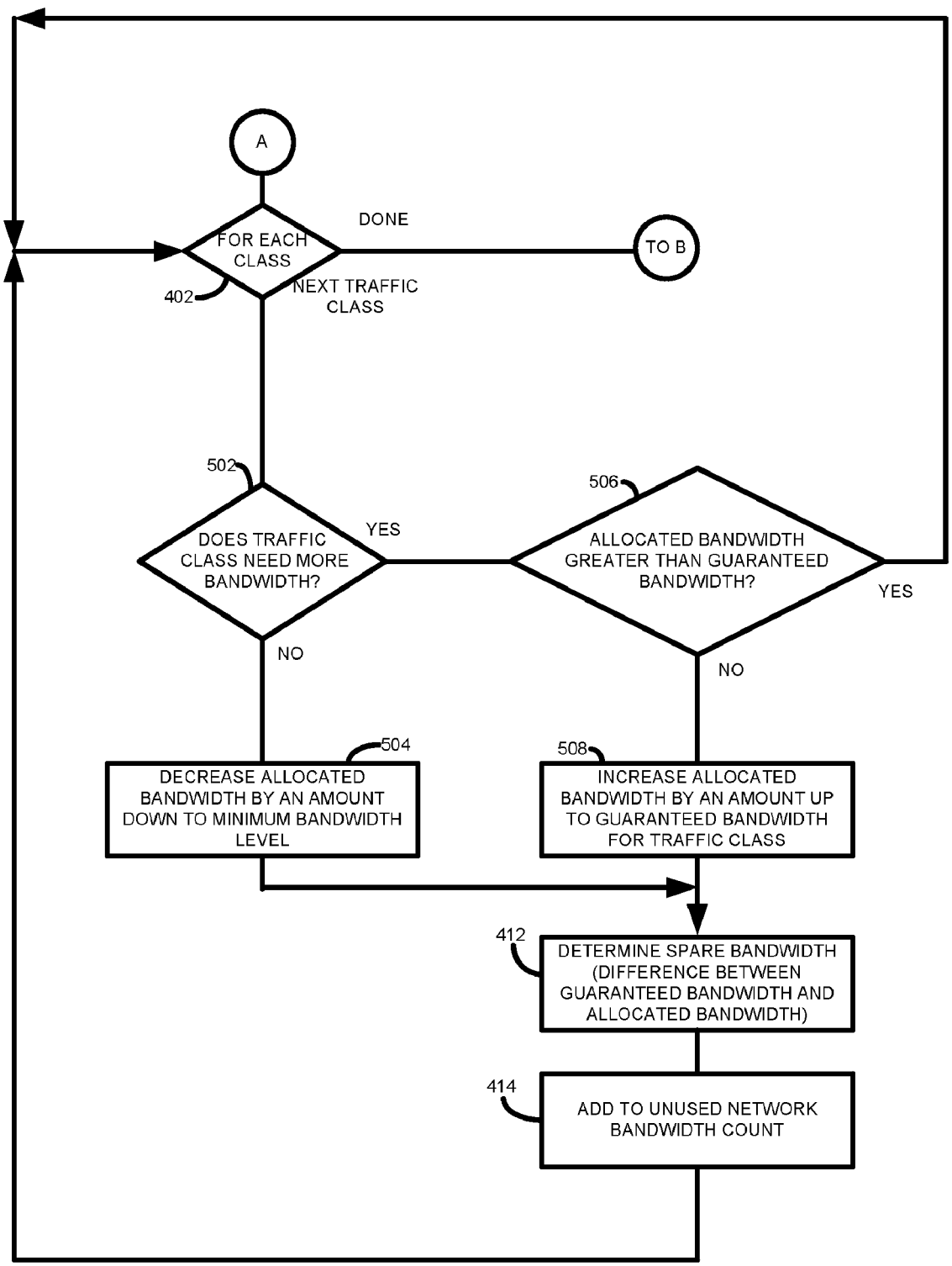
FIG. 5 is a simplified flow diagram outlining a method according to an embodiment of the present invention.

Referring now to FIG. 5 there is shown a simplified diagram outlining the operation of the network manager 302 according to a further embodiment of the present invention.

At 502 the network manager 302 determines, for the previous period P, whether the current traffic class being analyzed could benefit from having some additional bandwidth.

In the present embodiment this is achieved by determining whether a traffic class used more than a predetermined amount of the bandwidth available for that traffic class at any one switch during the previous period P. For example, traffic class 1 is allocated 7 VLANs giving traffic class 1 a maximum available bandwidth at each edge switch 104 of 14 Gb/s (and hence a total network bandwidth of 224 Gb/s). Traffic class 2 is allocated 5 VLANS giving traffic class 2 a maximum available bandwidth at each edge switch of 10 Gb/s (and a total network bandwidth of 160 Gb/s). Traffic class 3 is allocated 3 VLANS giving traffic class 3 a maximum available bandwidth at each edge switch of 6 Gb/s (and a total network bandwidth of 96 Gb/s).

When a host, such as host 102, needs to send data over the network 300 the application sending the data sends the data through a transport control protocol/Internet protocol (TCP/IP) stack (not shown). The TCP/IP stack packages the data to be sent into data packets and sends the packets through a data link 103. Since the TCP/IP stack does not know the bandwidth of the data link 103 the TCP/IP stack starts sending a small amount of data packets over the data link 103. If, after a short time, no dropped packet notifications are been received, the TCP/IP stack increases the amount of data packets being sent and again waits a short time to determine whether any dropped packet notifications are received. This process continues until the TCP/IP stack receives some dropped packet notifications. At this point, the TCP/IP stack determines that too much data has been sent, and therefore reduces or throttles back the amount of data being sent until no more dropped packet notifications are received. At this point the TCP/IP stack increases the amount of data sent and the cycle continues. This iterative process is referred to herein as TCP elasticity. This process has the effect that the amount of data sent by a TCP/IP stack is not stable over time.

Due to TCP elasticity a data link is unlikely to be fully utilized over a period of time, since as soon as the TCP stack sends more data than the link can handle it throttles back the amount of data sent, before ramping up the amount of data sent some time after. Accordingly, a determination of whether a data link is being fully utilized is made herein when it is determined that a predetermine percentage of the bandwidth of a data link has been used over a predetermined period. In the present embodiment the predetermined percentage is set at 90%, although in other embodiments a higher or lower percentage may be chosen.

The determination made in 502 is made on a per edge switch basis, rather than as an average of the bandwidths collected from all edge switches. For example, if one host is sending a high quantity of data to only one other host in the network 300, at the edge switch connected to the sending host the determined bandwidth utilization will be above the predetermined threshold described above. At edge switches connected to other idle hosts, however, the determined bandwidth will be low. Accordingly, computing average bandwidth utilization across all switches will not reveal that the traffic class would benefit from having additional bandwidth at one particular switch.

As described further below, allocated bandwidth ($B_A$) defines the amount of bandwidth allocated to a traffic class at a given time. Allocated bandwidth ($B_A$) may be greater or lesser than the guaranteed bandwidth ($B_G$), as described below. For example, if at 502 the network manager 302 determines that the traffic class would not benefit from additional bandwidth it reduces (504) the amount of allocated bandwidth ($B_A$) by a predetermined amount (K). If, however, at 502, the network manager 302 determines that the traffic class would benefit from additional bandwidth the network manager 302 determines (506) whether the allocated bandwidth ($B_A$) for the traffic class being analyzed is greater than its guaranteed bandwidth ($B_G$). If the network manager 302 so determines, the next traffic class is analyzed. Otherwise the network manager 302 increases (508) the allocated bandwidth ($B_A$) by a predetermined amount (K) up to a maximum of the guaranteed bandwidth ($B_G$) for that traffic class.

The predetermined amount (K) by which the allocated bandwidth is increased or decreased may be, for example, a fixed amount, such as 2 Gb/s, or a percentage, such as 20%. Where it is a fixed amount the amount may be based, for example, on a percentage of the total bandwidth of the network 300 taking into account, for example, the number of VLANs or switches. In one embodiment the predetermined amounts for bandwidth increase and decrease may be different.

The effect of the above-described process is that in a short number of cycles the allocated bandwidth of a traffic class may be increased or decreased significantly.

The network manager 302 then determines (412) whether the current allocated bandwidth ($B_A$) is less than the guaranteed bandwidth ($B_G$), and if so amount of unused bandwidth is determined and is added (414) to an unused bandwidth count ($B_U$). The unused bandwidth count ($B_U$) accounts for all of the determined unused bandwidth among all of the traffic classes. In at least some embodiments the unused bandwidth count may be less than the total amount of free bandwidth. The next traffic class is then analyzed.

Figure 4B:
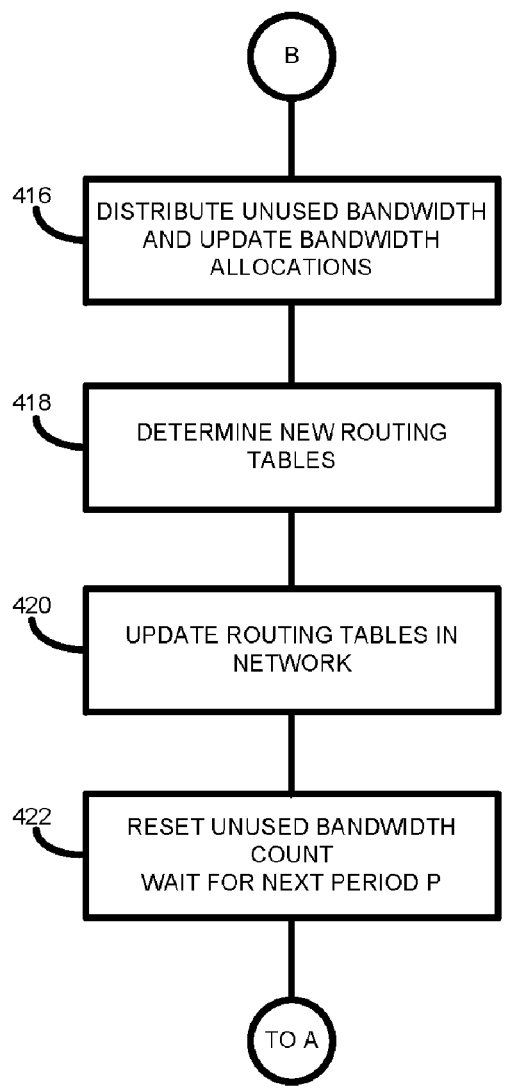

Once all the traffic classes have been analyzed the above-described mechanism of distributing any un-used bandwidth shown in FIG. 4b may be performed. In the present embodiment, however, only traffic classes identified in 502 that would benefit from additional bandwidth are allocated a share of the total unused bandwidth $B_U$.

Operation of the above-described process is further illustrated below with reference to Tables 9 and 10. In the following example the predetermined period P used in 422 is set to 30 seconds and the predetermined amount (K) by which the bandwidth is increased or decreased is 10 Gb/s.

TABLE 9

Example traffic class guaranteed bandwidths

| GUARANTEED BANDWIDTH PER TRAFIC CLASS | BANDWIDTH (Gb/s) |
|---|---|
| $B_{G\,TC1}$ | 224 |
| $B_{G\,TC2}$ | 160 |
| $B_{G\,TC3}$ | 96 |

TABLE 10

Example bandwidth allocation evolution over time

| | | | | Would Traffic Class benefit from more bandwidth? | | | |
|---|---|---|---|---|---|---|---|
| PERIOD | $B_{A\,TC1}$ | $B_{A\,TC2}$ | $B_{A\,TC3}$ | $TC_1$ | $TC_2$ | $TC_3$ | $B_U$ |
| 1 | 224 | 160 | 96 | Yes | No | No | 20 |
| 2 | 244 | 150 | 86 | Yes | Yes | No | 20 |
| 3 | 244 | 160 | 76 | Yes | Yes | Yes | 20 |
| 4 | 224 | 160 | 96 | No | No | Yes | |
| 5 | ... | ... | ... | ... | ... | ... | ... |

At the start of period $P_1$, traffic classes 1, 2, and 3 are allocated respectively 224 Gb/s, 160 Gb/s, and 96 Gb/s. Over period $P_1$ the network manager 302 determines (502) that traffic class 1 would benefit from more bandwidth and determines that traffic classes 2 and 3 would not benefit from additional bandwidth. Accordingly, the allocated bandwidth $B_{A\,TC2}$ for traffic class 2 is reduced by 10 Gb/s to 150 Gb/s, and the allocated bandwidth $B_{A\,TC3}$ is reduced by 10 Gb/s to 86 Gb/s. Taking into account the reduced bandwidth allocations once all data for each traffic class has been analyzed it is determined that the unused network bandwidth is 20 Gb/s. At 416 all of the unused bandwidth $B_U$ is added to the bandwidth allocation for traffic class 1, $B_{A\,TC1}$, taking its allocation to 244 Gb/s.

As can be seen, over time the bandwidth allocations for each traffic class evolve depending on the bandwidth used by each traffic class over a given period and the amount of spare bandwidth, if any, available.

One advantage of the above-described embodiments is that the bandwidth required by any traffic class may be substantially determined without requiring knowledge of the bandwidth requirements of that traffic class. For example, if it is determined that there is unused bandwidth in the network, and further if it is determined that a traffic class would benefit from additional bandwidth, the traffic class is allocated, in addition to its current bandwidth allocation, a share of the unused bandwidth. Conversely, where it is determined that a traffic class would not benefit from addition bandwidth its bandwidth allocation is reduced. This enables unused bandwidth to be allocated to traffic classes that would benefit from having additional bandwidth. Furthermore, the system ensures that should a traffic class require its guaranteed bandwidth, then that traffic class is quickly allocated its guaranteed bandwidth.

The guaranteed bandwidths $B_G$ of each traffic class stored in the bandwidth allocation store 304 may be modified, if required, during operation of the network. Such a modification may be performed, for example, by an appropriate system manager or administrator.

The above-described embodiments advantageously enable a fuller utilization of available network bandwidth improving efficiency.

Figure 6:
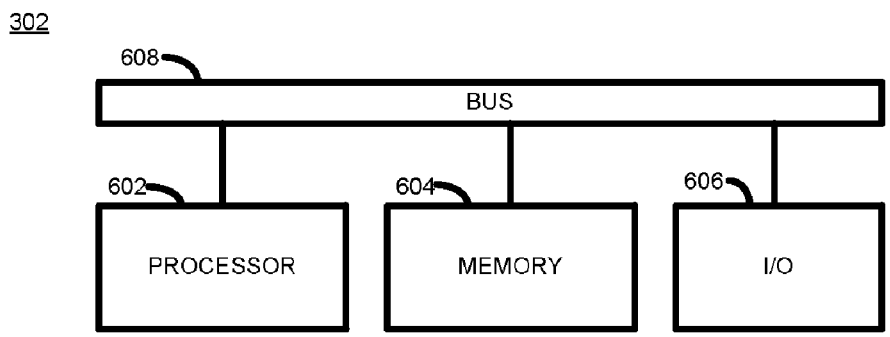
FIG. 6 is a simplified block diagram of a network manager according to an embodiment of the present invention.

Referring now to FIG. 6 there is shown a block diagram of an embodiment of the network manager 302. The network manager 304 may comprise, for example, a micro processor, control logic, or micro controller 602 for executing machine readable instructions stored in a memory 604. The machine readable instructions may, when executed by the processor 602, perform method steps as described above. Input and output operations may be handled by an I/O module 606. The processor 602, memory 604, and I/O interface 606 are coupled via a bus 608.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A system for allocating bandwidth in a network to a plurality of traffic classes, the system comprising:
a network manager, the network manager comprising a processor to:
determine a bandwidth utilization for each traffic class of the plurality of traffic classes, each traffic class having a first bandwidth allocation included in one or more routing tables accessible by one or more routers;
calculate a second bandwidth allocation for each traffic class based on the first bandwidth allocation of a respective traffic class of the plurality of traffic classes and the determined bandwidth utilization for the respective traffic class;
determine an amount of total unused network bandwidth based on the second bandwidth allocations for all the traffic classes;
recalculate the second bandwidth allocation for each traffic class to include allocating a share of the determined amount of total unused network bandwidth to the second bandwidth allocation of between at least some of the traffic classes; and
replace the first bandwidth allocation for each traffic class with the second bandwidth allocation for the respective traffic class in the one or more routing tables accessible by the one or more routers in the network to include the recalculated second bandwidth allocations,
wherein the one or more routers enforce the recalculated bandwidth allocations for each traffic class.

2. The system of claim 1, further comprising a plurality of routers each router connected to one more hosts, each of the routers to assign data packets received from at least one of the hosts to one of the plurality of traffic classes, and to forward the received data packets on a data link according to the routing table and assigned traffic class.

3. The system of claim 1, wherein to calculate a second bandwidth allocation for each traffic class, the network manager is to:
determine whether the determined bandwidth utilization is less than the first bandwidth allocation for the traffic class;
when determined that the determined bandwidth utilization is less than the first bandwidth allocation:
allocate a predetermined amount of bandwidth to the determined bandwidth utilization for the second bandwidth allocation for the traffic class; and
determine any unused bandwidth for the traffic class.

4. The system of claim 1, wherein the network manager is to determine the bandwidth utilization for each traffic class by interrogating the routers in the network.

5. The system of claim 2, wherein the routers are to forward received data packets on one of a physical data link or a virtual local area network (VLAN).

6. The system of claim 2, wherein the routing table is integral to each router.

7. The system of claim 5 wherein the routing table defines which traffic classes are to be sent over which VLANs.

8. The system of claim 7, wherein the routing table allocates more than one traffic class to the same VLAN.

9. The system of claim 1, wherein the network manager is to periodically:
determine the bandwidth utilization for each traffic class,
determine the total of unused network bandwidth,
calculate the second bandwidth allocations, and
update the one or more routing tables.

10. The system of claim 2 wherein the routers are to allocate data packets to a traffic class using hash-based routing.

11. The system of claim 1, wherein the first bandwidth allocations are updatable.

12. The system of claim 3, wherein to determine an amount of total unused network bandwidth, the network manager is to add the determined unused bandwidth for each traffic class to a previous total amount of unused network bandwidth.

13. The system of claim 3, wherein the predetermined amount of bandwidth allocated is a fixed amount.

14. The system of claim 1, wherein to calculate a second bandwidth allocation for each traffic class, the network manager is not to calculate a second bandwidth allocation greater than the first bandwidth allocation.

15. The system of claim 1, wherein to allocate a share of any determined amount of total unused network bandwidth to the second bandwidth allocation of at least some of the traffic classes, the network manager is to allocate a share of any determined amount of total unused network bandwidth to:
the second bandwidth allocation of each traffic class, or
the second bandwidth allocation of each traffic class that has a second bandwidth allocation equal to the first bandwidth allocation.

16. A method of allocating bandwidth in a network to a plurality of traffic classes, the method comprising:

determining a bandwidth utilization for each traffic class of the plurality of traffic classes, each traffic class having a first bandwidth allocation included in one or more routing tables accessible by one or more routers;

calculating for each traffic class a second bandwidth allocation based on a first bandwidth allocation of a respective traffic class of the plurality of traffic classes and the determined bandwidth utilization for the respective traffic class;

determining an amount of total unused network bandwidth based on the second bandwidth allocation for all traffic classes;

recalculating the second bandwidth allocation for each traffic class to include allocating a share of the determined amount of total unused network bandwidth to the second bandwidth allocation of at least some of the traffic classes; and replacing the first bandwidth allocation for each traffic class with the second bandwidth allocation for the respective traffic class in the one or more routing tables accessible by the one or more routers in the network to include the recalculated second bandwidth allocations, the one or more routers enforcing the recalculated bandwidth allocations for each traffic class, whereby the one or more routers assign received data packets to one of the plurality of traffic classes and forwards the received data packets on a data link in accordance with the routing table.

17. The method of claim 16, wherein the first bandwidth allocation is a guaranteed bandwidth and calculating for each traffic class a second bandwidth allocation further comprises:

determining whether the bandwidth utilization for a traffic class is greater or is equal to its respective guaranteed bandwidth;

making the second bandwidth allocation equal to the guaranteed bandwidth when determined that the bandwidth utilization for the traffic class is greater or equal to its respecting guaranteed bandwidth; and making the second bandwidth allocation equal to the determined bandwidth utilization plus a predetermined amount when it is determined that the determined bandwidth utilization for a traffic class is less than its respective guaranteed bandwidth.

18. The method of claim 16, wherein calculating for each traffic class a second bandwidth allocation further comprises:

determining whether a traffic class requires more bandwidth;

calculating the second bandwidth allocation by reducing the first bandwidth allocation by a predetermined amount when determined that a traffic class does not require more bandwidth;

determining whether the first bandwidth allocation is greater than a guaranteed bandwidth when determined that a traffic class requires more bandwidth;

calculating the second bandwidth allocation by increasing the first bandwidth allocation by a predetermined amount when determined that the traffic class requires more bandwidth and the first bandwidth allocation is not greater than a guaranteed bandwidth.

19. The method of claim 16, wherein determining a total amount of unused bandwidth further comprises adding to the total amount of unused bandwidth any positive difference between the first bandwidth allocation and the second bandwidth allocations for each traffic class.

20. A system for allocating bandwidth in a network to a plurality of traffic classes, the system comprising:

a plurality of switches:
to assign data packets received from a host to one of a plurality of traffic classes, and to route the received data packets on a data link, the data link chosen based on one or more routing tables and assigned traffic class; and a network manager configured to:
determine, through at least some of the plurality of switches, a bandwidth utilization for each traffic class of the plurality of traffic classes, each traffic class having a first bandwidth allocation included in the one or more routing tables accessible by the plurality of switches;

calculate a second bandwidth allocation for each traffic class based on the first bandwidth allocation of a respective traffic class of the plurality of traffic classes and the determined bandwidth utilization for the respective traffic class;

determine an amount of total unused network bandwidth by determining whether the determined bandwidth utilization of each traffic class is less than the first bandwidth allocation for the traffic class;

allocate a share of any determined amount of total unused network bandwidth to the second bandwidth allocation of at least some of the traffic classes; and update, in accordance with the second bandwidth allocations, the one or more routing tables wherein the updating includes replacing the first bandwidth allocation for each traffic class with the second bandwidth allocation for the respective traffic class in the one or more routing tables.

* * * * *

UNITED STATES PATENT AND TRADEMARK OFFICE
CERTIFICATE OF CORRECTION

PATENT NO. : 8,392,571 B2
APPLICATION NO. : 12/771059
DATED : March 5, 2013
INVENTOR(S) : Michael Schlansker et al.

It is certified that error appears in the above-identified patent and that said Letters Patent is hereby corrected as shown below:

In the Claims:

In column 11, line 64, in Claim 1, after "of" delete "between".

In column 14, line 13, in Claim 19, delete "allocations" and insert -- allocation --, therefor.

Signed and Sealed this
Thirteenth Day of August, 2013

Teresa Stanek Rea
*Acting Director of the United States Patent and Trademark Office*